(12) United States Patent
Meng et al.

(10) Patent No.: US 11,134,655 B2
(45) Date of Patent: Oct. 5, 2021

(54) AUTOMATIC BLOW-DRYING DEVICE FOR PETS

(71) Applicants: VANSEN INTELLIGENT MANUFACTURING CO., LTD., Fujian (CN); Naturesque LLC, Maple Grove, MN (US)

(72) Inventors: Shifei Meng, Fujian (CN); Xiaowen Zheng, Fujian (CN)

(73) Assignees: VANSEN INTELLIGENT MANUFACTURING CO., LTD., Fujian (CN); NATURESQUE LLC, Maple Grove, MN (US)

( * ) Notice: Subject to any disclaimer, the term of this patent is extended or adjusted under 35 U.S.C. 154(b) by 198 days.

(21) Appl. No.: 16/399,564

(22) Filed: Apr. 30, 2019

(65) Prior Publication Data

US 2020/0305389 A1    Oct. 1, 2020

(30) Foreign Application Priority Data

Apr. 1, 2019    (CN) .......................... 201910256109.4

(51) Int. Cl.
*A01K 13/00*    (2006.01)
*A47K 10/48*    (2006.01)
*A01K 1/00*    (2006.01)

(52) U.S. Cl.
CPC .......... *A01K 13/001* (2013.01); *A01K 1/0076* (2013.01); *A47K 10/48* (2013.01)

(58) Field of Classification Search
CPC ........ A01K 13/00; A01K 1/0076; A01K 1/00; A47K 10/48

USPC .......................................................... 119/600
See application file for complete search history.

(56) References Cited

U.S. PATENT DOCUMENTS

| | | | | |
|---|---|---|---|---|
| 1,714,635 A | * | 5/1929 | Schafer ..................... | A61D 7/00 119/678 |
| 2,248,867 A | * | 7/1941 | Hallman, Sr. .......... | A01K 59/00 219/400 |
| 2,530,148 A | * | 11/1950 | Bjorklund .............. | A01K 31/08 119/474 |

(Continued)

FOREIGN PATENT DOCUMENTS

| CN | 208175742 U | 12/2018 |
|---|---|---|
| CN | 208490563 U | 2/2019 |

*Primary Examiner* — Ebony E Evans
(74) *Attorney, Agent, or Firm* — Muncy, Geissler, Olds & Lowe, P.C.

(57) ABSTRACT

An automatic blow-drying device for pets includes a pet cage and a drying unit, wherein the drying unit is arranged on one side of the pet cage and comprises an air source, air supply passages are respectively arranged on two sides of the air source and are provided with heating elements, the pet cage is provided with openings which are matched with the air supply passages to form stationary air ports, the air supply passages on the two sides are matched with the corresponding stationary air ports to allow an air flow to enter the pet cage to form a surrounding drying area, and the drying unit is connected with an adjustable air port used for blowing air into areas, except for the surrounding drying area, in the pet cage. According to the domestic automatic blow-drying device for pets, a pet can be directly placed in the device to be blow-dried after being bathed, so that the situation where water and pet hair spread all around in a house after the pet is bathed is prevented.

11 Claims, 5 Drawing Sheets

(56) References Cited

U.S. PATENT DOCUMENTS

| | | | | |
|---|---|---|---|---|
| 3,058,445 | A * | 10/1962 | Johnson | A01K 1/03 119/474 |
| 3,175,534 | A * | 3/1965 | Pollard | A01K 13/001 119/174 |
| 3,896,766 | A * | 7/1975 | Martin | A01K 1/03 119/474 |
| 4,762,085 | A * | 8/1988 | Ondrasik | A01K 1/08 119/474 |
| 4,917,047 | A * | 4/1990 | Wazeter, III | A01K 1/03 119/474 |
| 5,435,269 | A * | 7/1995 | Chen | A01K 13/001 119/668 |
| 6,058,886 | A * | 5/2000 | Haines | A01K 13/001 119/601 |
| 6,637,374 | B2 * | 10/2003 | Hawks | A01K 1/0076 119/448 |
| 6,826,850 | B2 * | 12/2004 | Jewell | F26B 19/00 34/222 |
| 8,186,307 | B2 * | 5/2012 | Moharram | A01K 13/001 119/651 |
| 9,451,758 | B2 * | 9/2016 | Kaneda | A01K 13/001 |
| 9,675,047 | B2 * | 6/2017 | Carter | A01K 13/001 |
| 9,877,463 | B2 * | 1/2018 | Labrecque | A01K 1/0076 |
| 10,143,182 | B1 * | 12/2018 | Ferro | D06F 18/00 |
| 10,426,139 | B1 * | 10/2019 | Hill | A01K 13/001 |
| 10,709,103 | B1 * | 7/2020 | Kinsey | F25D 23/063 |
| 2007/0245975 | A1 * | 10/2007 | Udelle | A01K 13/004 119/600 |
| 2012/0312246 | A1 * | 12/2012 | Doumas | A01K 13/001 119/606 |

* cited by examiner

AUTOMATIC BLOW-DRYING DEVICE FOR PETS

BACKGROUND OF THE INVENTION

1. Technical Field

The invention discloses an automatic blow-drying device for pets, belonging to the technical field of drying and manufacturing for pets in terms of International Patent Classification (IPC), and particularly relates to a domestic blow-drying device for pets.

2. Description of Related Art

At present, more and more people like keeping pets and regard the pets as necessities in life, with the improvement of the living standard for the reason that people may feel less lonely with the company of the pets and may enjoy a lot of fun that is brought by the pets. Meanwhile, people should also take care of clothing, feeding, and living of the pets. Pets have been accepted as one of the family members to live together with people, but most existing pets kept by people are hairy animals such as cats and dogs. The pets have to be bathed frequently so as to be kept clean, and it will take a long time to dry the hairy pets after a bath. If naturally dried, the pets may get stained instantly after being cleaned, or the pets may shake water and hair down when walking around in a house. A long handling time is required if an electric hair dryer is used to dry the pets. All automatic pet dryers available on the existing market are large-sized noisy facilities which are mainly used in pet shops.

Chinese Utility Model Patent Authorized Publication No. CN 208490563 U discloses a fully-automatic pet hair drying device which comprises a square box, wherein a grid is arranged at the bottom of the square box, a hollow base is detachably connected to the bottom of the square box, an inlet is formed in the front side of the square box, two fans are arranged on the right side of the square box and are respectively fixed to the bottom and the top of the box, heating devices are arranged on the left side of the fans, each heating device has one end connected to the bottom of the box and one end connected to the top of the box, and a brush is vertically arranged on the left side of each heating device. In this solution, the fans cooperate with the heating devices to generate hot air to fulfill drying in a way similar to electric hair dryers. However, an air flow generated by the fans can be diffused, so that the utilization rate of the hot air is low.

Chinese Utility Model Patent Authorized Publication No. CN 208175742 U discloses a pet drying device which comprises a top cover and a lower box, wherein a microprocessor is arranged in the top cover which is provided with a touch screen, the lower box comprises a PTC heater, a turbofan, an air supply channel, a temperature sensor, a ventilation opening, a drying chamber, a hair collection bin and an air supply chamber, wherein the PTC heater and the turbofan are arranged in the fan chamber located on one side of the lower box, the turbo fan is arranged at an air outlet of the fan chamber, the PTC heater is arranged at an air return port of the fan chamber, and two air outlets of the fan chamber are connected with the air supply channel. In this solution, the air supply channel used for blowing air to pets has an opening located at the bottom, so that an area in which air cannot be blown to pets is generated, that is to say, an air-blowing dead space is generated.

BRIEF SUMMARY OF THE INVENTION

To overcome the defects of the prior art, the invention provides an automatic blow-drying device for pets. According to the automatic blow-drying device for pets, air supply channels are reasonably designed to ensure a large air outlet area and to prevent a surrounding air flow from being blocked; and an adjustable air outlet is additionally arranged to avoid an air-blowing dead space, so that pets can be comprehensively blow-dried.

The following technical solution is adopted by the invention to fulfill the above objective:

An automatic blow-drying device for pets comprises a pet cage and a drying unit, wherein the drying unit is arranged on one side of the pet cage and comprises an air source, air supply passages are respectively arranged on two sides of the air source and are provided with heating elements, the pet cage is provided with openings which are matched with the air supply passages to form stationary air ports, the air supply passages on the two sides are matched with the corresponding stationary air ports to allow an air flow to enter the pet cage to form a surrounding drying area, and the drying unit is connected with an adjustable air port used for blowing air into areas, except for the surrounding drying area, in the pet cage.

Furthermore, an air inlet is formed in the outer side of the drying unit, a main air duct is formed in the drying unit and is provided with a plurality of notches to be connected with the stationary air ports in the pet cage, heating pieces are arranged at the notches, and temperature switches are arranged on the heating pieces to make sure that the outlet air temperature is within a reasonable temperature range.

Furthermore, the drying unit comprises a main body and a stationary frame, wherein the main body is connected with the stationary frame, an air inlet is formed in the back of the main body, the main body is matched with the stationary frame to form a main air duct and air supply channels extending towards two sides, the main air duct is matched with the air supply channels to form the air supply passages, a fan rotates in the main air duct to form the air source, and the air supply channels are provided with arc-shaped passages towards the stationary air ports, so that arc-shaped surrounding air flows are formed after air is blown out.

Furthermore, the fan comprises a wind wheel and a motor, wherein the motor is fixed to the stationary frame, and the wind wheel is fixed to the motor and is located in the main air duct.

Furthermore, an outlet is formed in the top of the main air duct of the drying unit and is connected with a tube which extends towards the top surface of the pet cage to form an adjustable air port; the tube is provided with a support frame, thereby being convenient to move and position; and a plurality of holes allowing air from the tube to enter are formed in the top surface of the pet cage.

Furthermore, the drying unit is provided with a control panel which is connected with a control circuit, and a motor and the temperature controllers are connected to the control circuit.

Furthermore, a collection tray used for collecting water drops and pet hair is arranged at the bottom of the pet cage.

Furthermore, the pet cage is a foldable cage and is formed by a plurality of pieces assembled through rotary shafts, thereby being convenient to fold.

Furthermore, the pet cage is defined by a front shell, a rear shell, a top cover, two side faces and a bottom face, wherein:

The top cover has a front part hinged to the front shell through a rotary shaft and has two sides covering the two side faces and the rear shell;

Each side face has a front part hinged to the front shell through a rotary shaft and a rear part hinged to the rear shell through a rotary shaft, a four-faced structure of the pet cage is formed by the two side faces, the front shell and the rear shell, the bottoms of the two side faces abut against corresponding sizes of the bottom face, and each side face comprises two pieces which are connected through a rotary shaft, so that panels capable of being folded inwards are formed;

The bottom face has a front part hinged to the front shell through a rotary shaft and a rear part in butt joint with the rear shell.

Furthermore, the front shell and the main body are locked and fixed together, the front shell is provided with the stationary air ports matched with the drying unit, the rear shell is a baffle, the top cover, the two side faces and the bottom face are provided with a plurality of through holes, and the top cover and the rear shell are locked and fixed together through a buckle.

Furthermore, when the pet cage is folded, the bottom face is turned upwards first, then the two side faces are folded towards the middle, the rear shell is pushed towards the front shell to be stacked on the side faces, and finally, the top cover moves downwards to cover the rear shell.

Furthermore, the front side of the front shell is matched with the main body of the drying unit and is provided with a seal ring part matched with the main body, extension parts extending backwards are formed on the periphery of the back side of the front shell and are respectively connected with the top cover, the side faces and the bottom face, and the extension part, matched with the top cover, of the front shell is higher than the extension parts, matched with the side faces and the bottom face, of the front shell.

According to the domestic automatic blow-drying device for pets, a pet can be directly placed in the device to be blow-dried after being bathed, so that the situation where water and pet hair spread all around in a house after the pet is bathed is prevented. When not used, the device can be folded to a smaller size, so that the storage space is reduced. The configuration of the annular stationary air outlets ensures a large air area and prevents the surrounding air flow from being blocked, and the tube connected with the adjustable air port can be fixed to an air-blowing dead space. The device has the advantages of being high in air utilization rate, foldable, convenient to store, and the like.

DETAILED DESCRIPTION OF THE INVENTION

The invention is further explained below with reference to the accompanying drawings.

Embodiment: Referring to FIGS. 1-6, an automatic blow-drying device for pets comprises a pet cage 1 and a drying unit 2. The drying unit 2 is arranged on one side of the pet cage 1 and comprises an air source. Air supply passages 3 are respectively arranged on two sides of the air source and are provided with heating elements 4. The pet cage 1 is provided with openings which are matched with the air supply passages to form stationary air ports 201. The air supply passages 3 on the two sides are matched with the corresponding stationary air ports 201 to allow an air flow to enter the pet cage to form a surrounding drying area. The drying unit 2 is connected with an adjustable air port 202 so as to blow air into areas, except for the surrounding drying area, in the pet cage 1. An air inlet 203 is formed in the outer side of the drying unit. A main air duct 31 is formed in the drying unit and is provided with a plurality of notches to be connected with the stationary air ports in the pet cage 1. A heating piece is arranged at each notch and is provided with a temperature switch or temperature controller 41, so that it is ensured that the outlet air temperature is within a reasonable temperature range. The drying unit 2 comprises a main body 21 and a stationary frame 22, wherein the main body 21 is connected with the stationary frame 22, the air inlet 203 is formed in the back of the main body 21, the main body is matched with the stationary frame to form the main air duct 31 and air supply channels 32 extending towards two sides, the main air duct 31 is matched with the air supply channels 32 to form the air supply passages, a fan 5 rotates in the main air duct 31 to form the air source, and the air supply channels 32 are provided with arc-shaped passages 321 towards the stationary air ports, so that arc-shaped surrounding air flows are generated after air is blown out. The fan 5 comprises a wind wheel 51 and a motor 52, wherein the motor 52 is fixed to the stationary frame 22, and the wind wheel 51 is fixed to the motor 52 and is located in the main air duct. The fan is a centrifugal fan or fan facilities with a similar function.

In this disclosure, the drying unit 2 is arranged on one side of the pet cage 1, wherein this side is a circumferential side, a bottom side or a top side of the pet cage.

Figure 4:
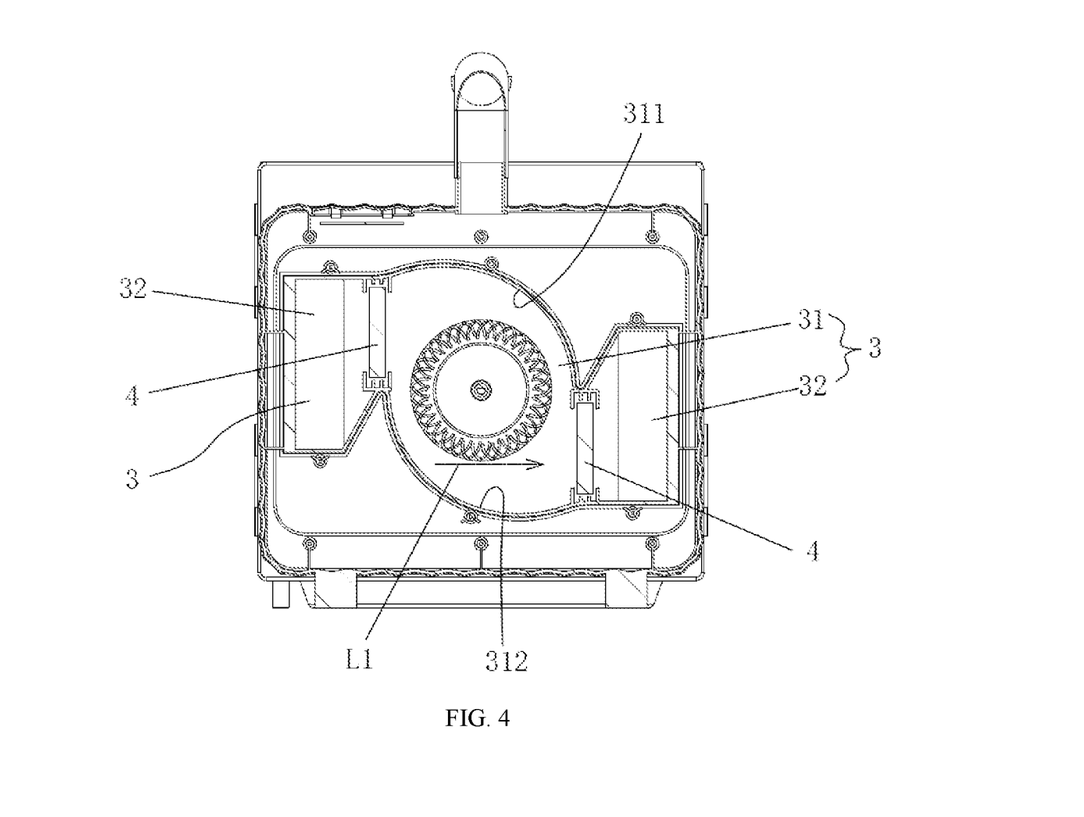
FIG. 4 is a longitudinal sectional view of flow passages of the embodiment of the invention.
Figure 5:
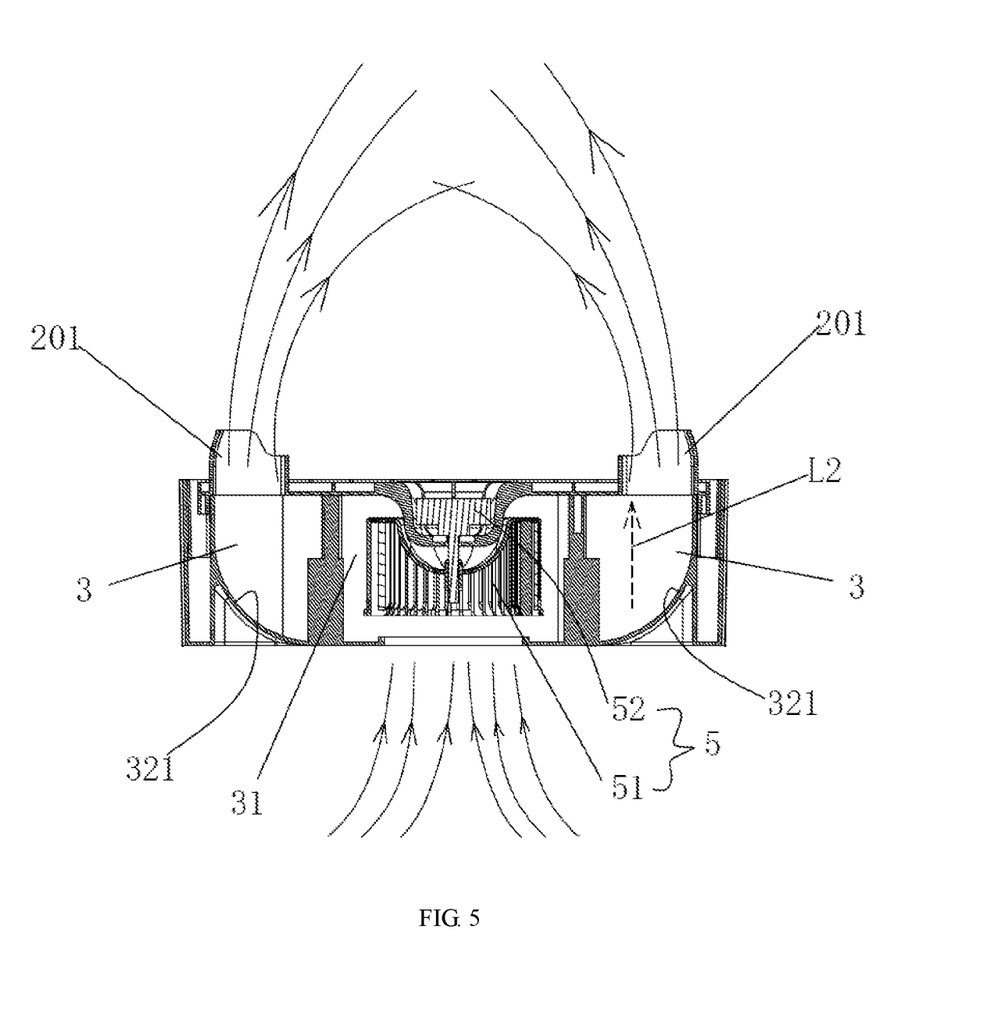
FIG. 5 is a horizontal sectional view of the flow passages of the embodiment of the invention.

Referring to FIG. 4, a first arc wall 311 and a second arc wall 312 are respectively arranged on the upper side and the lower side of the interior of the main air duct 31, so that air flows can smoothly flow out along the arc walls, and the resistance is reduced. The air supply channels on the two sides of the main air duct 31 are diagonally arrayed. Particularly, one of the air supply channels is disposed at an upper left position, while the other air supply channel is disposed at a lower right position; or, one of the air supply channels is disposed at an upper right position, while the other air supply channel is disposed at a lower left position. The main air duct 31 is disposed in a circumferential extension direction L1 of the rotation of the fan or the wind wheel, and the air supply channels on the two sides are disposed in an axial extension direction L2 of the rotation of the wind wheel, so that the plane where the main air duct is located is perpendicular to the plane where the air supply channels are located.

Figure 1:
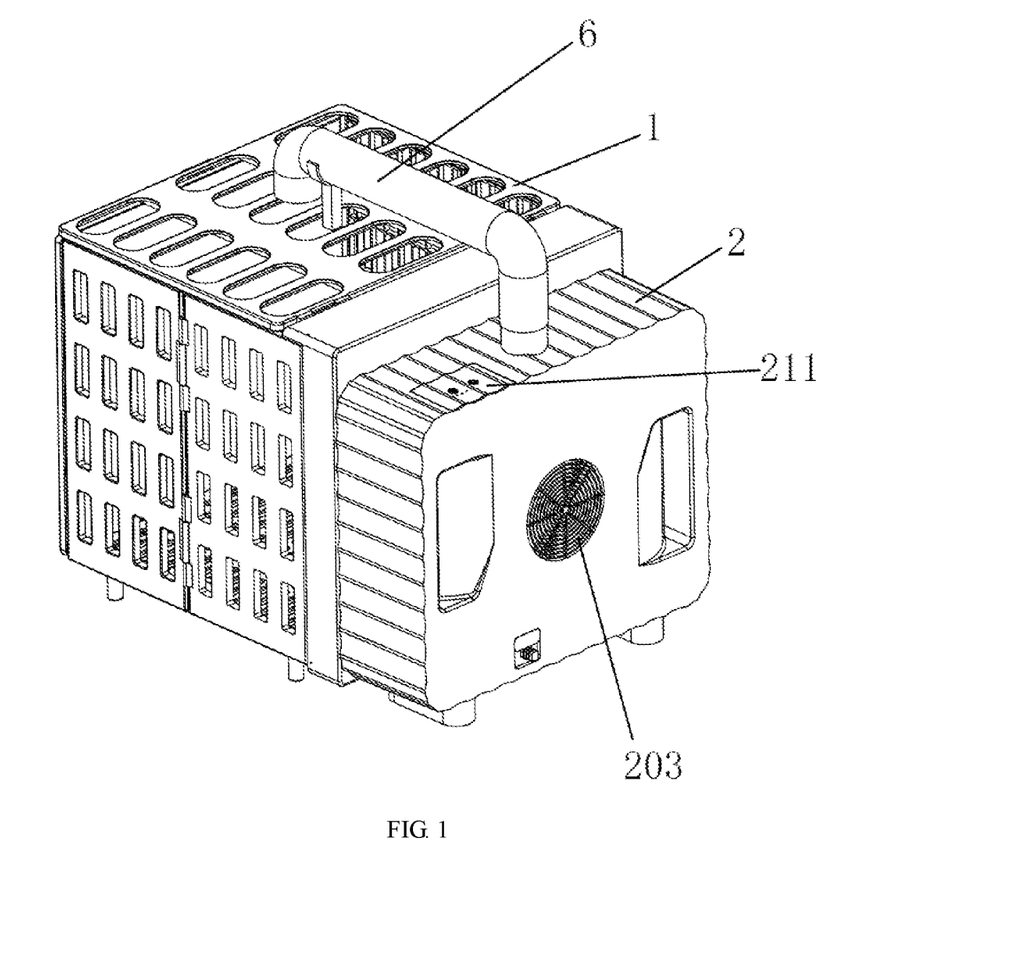
FIG. 1 is an overall view of one embodiment of the invention.
Figure 3:
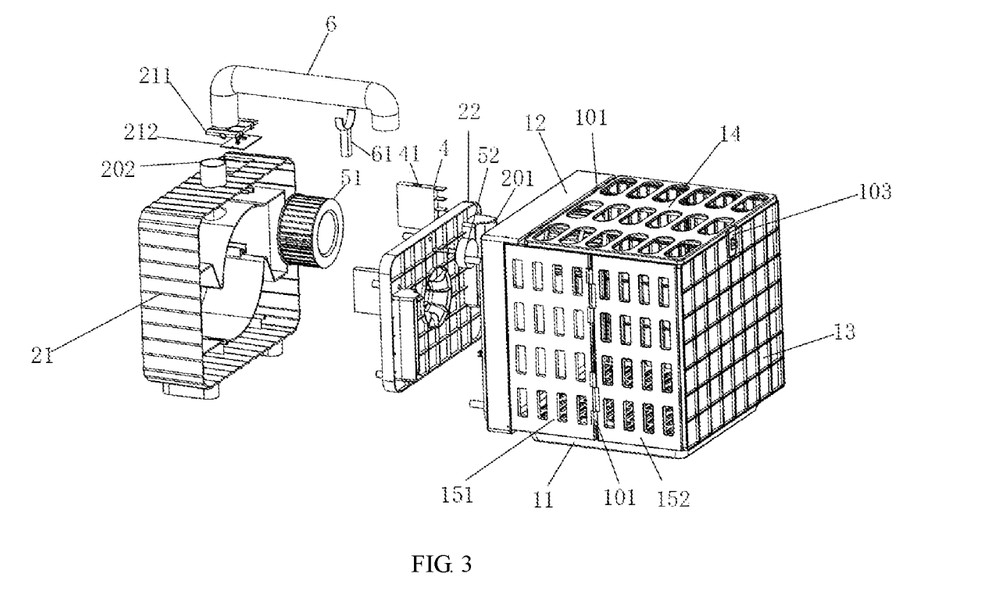
FIG. 3 is an exploded view of the embodiment of the invention.

Referring to FIG. 1 and FIG. 3, an outlet is formed in the top of the main air duct of the drying unit 2 and is connected with a tube 6 extending towards the top surface of the pet cage so as to form the adjustable air port 202. The tube 6 is provided with a support frame 61, thereby being convenient to move and position. A plurality of holes are formed in the top surface of the pet cage, and hot air in the tube enters the pet cage via the holes. The drying unit 2 is provided with a control panel 211 which is connected with a control circuit 212, and the motor and the temperature switches are connected to the control circuit.

Referring to FIG. 1, FIG. 3, and FIG. 4, a collection tray 11 is arranged at the bottom of the pet cage 1 and is used for collecting water drops and pet hair. Supporting legs are arranged on the bottom surface of the pet cage and are located on one side of the collection tray 11. A support is arranged at the bottom of the drying unit.

Figure 2:
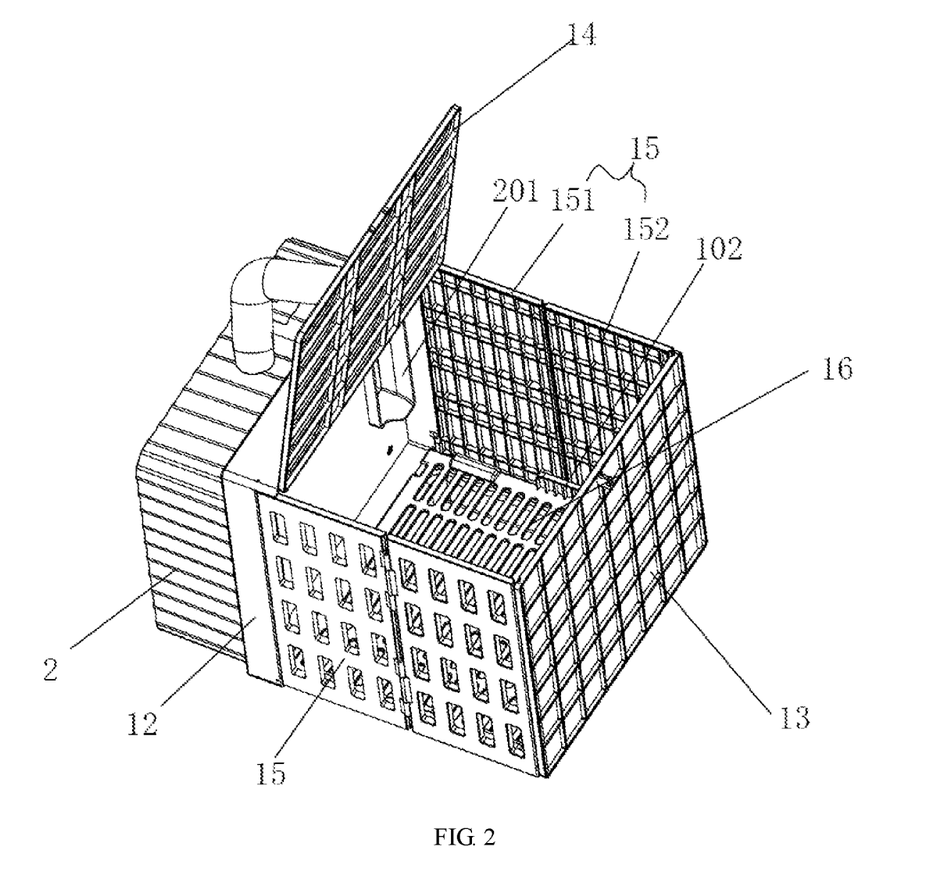
FIG. 2 is a view of the embodiment when a top cover is opened.
Figure 6:
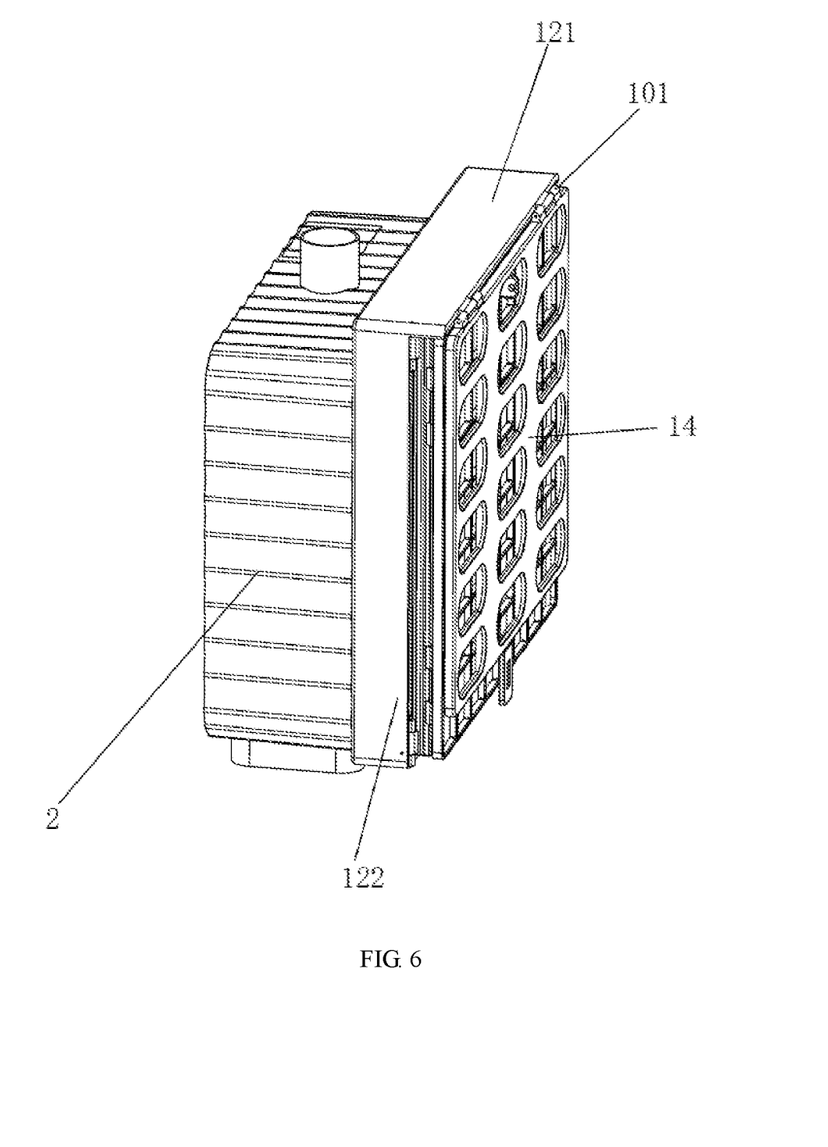
FIG. 6 is a schematic diagram of the embodiment, in a folded state, of the invention.

Referring to FIG. 1, FIG. 2, and FIG. 3, the pet cage 1 is a foldable cage and is formed by a plurality of pieces assembled through rotary shafts, thereby being convenient to fold. The pet cage 1 is defined by a front shell 12, a rear shell 13, a top cover 14, two side faces 15 and a bottom face 16, wherein the top cover 14 has a front part hinged to the front shell 12 through a rotary shaft and has two sides covering the two side faces 15 and the rear shell 13, the side faces 15 have front parts hinged to the front shell 12 through rotary shafts and have rear parts hinged to the rear shell 13 through rotary shafts, and a four-faced structure of the pet cage is formed by the two side faces 15, the front shell 12 and the rear shell 13; the bottoms of the two side faces 15 abut against corresponding sides of the bottom face 16, and the bottom face is provided with stop parts 102 to be matched with the side faces; and each side face 15 comprises two pieces which are connected through a rotary shaft, so that panels 151 and 152 capable of being folded inwards are formed; and the bottom face 16 is hinged to the front shell 12 through a rotary shaft and has a rear part in butt joint with the rear shell 13. The front side of the front shell 12 is matched with the main body of the drying unit 2 and is provided with a seal ring part matched with the main body. Extension parts extending backwards are formed on the periphery of the back side of the front shell and are respectively connected with the top cover, the side faces and the bottom face, wherein the extension part 121, matched with the top cover, of the front shell 12 is higher than the extension parts 122, matched with the side faces and the bottom face, of the front shell 12. When the pet cage 1 is folded, the bottom face 16 is turned upwards first, then the two side faces 15 are folded towards the middle, the rear shell 13 is pushed towards the front shell 12 to be stacked on the side faces, and finally, the top cover 14 moves downwards to cover the rear shell 13. FIG. 6 shows the pet cage in the folded state.

Referring to FIG. 3 and FIG. 4, the front shell 12 and the main body 21 are locked and fixed together, the front shell 12 is provided with the openings which are matched with the drying unit to form the stationary air port, the rear shell 13 is a baffle, the top cover 14, the two side faces 15 and the bottom face 16 are provided with a plurality of through holes, and the top cover 14 and the rear shell 13 are locked and fixed together through a buckle 103.

The technical issue to be settled by the invention is to provide a domestic automatic blow-drying device for pets. A pet can be directly placed in the device to be blow-dried after being bathed, so that the situation where water and pet hair spread all around in a house after the pet is bathed is prevented. When not used, the device can be folded to a smaller size, so that the storage space is reduced. Working principle of the invention: heat from the heating pieces is blown out by air, and pets are dried with the hot air; the configuration of the annular stationary air outlets ensures a large air area and prevents the surrounding air flow from being blocked, and the tube connected with the adjustable air port can be fixed to an air-blowing dead space; the temperature switches arranged on the heating pieces keep the outlet air temperature within a reasonable temperature range; the cage is foldable, so that the storage space is reduced; water drops and hair can be collected in the collection tray; and different air volumes can be achieved through multi-gear control.

The invention has the following structural characteristics:

1. The domestic automatic blow-drying device for pets is composed of the main body 21, the control panel 211, the control circuit 212, the tube 6, the support frame 61, the wind wheel 51, the motor 52, the heating pieces (heating elements 4), the temperature switches, the stationary frame 22, the pet cage 1 (cage), the collection tray 11, and the like.

2. The air inlet is formed in the back of the main body 21, and the air ducts and heating element fixing grooves used for mounting the heating elements 4, such as heating pieces, are arranged in the main body.

3. The motor 52 is fixed to the stationary frame 22, and the wind wheel 51 is fixed to the motor 52.

4. The temperature switches or the temperature controllers are attached to the heating pieces and are then disposed on the main body 21, and the stationary frame 22 is tightly pressed after being locked.

5. The main air duct is provided with a plurality of notches to be connected with the air outlet, and one heating piece is disposed at each notch.

6. The automatic blow-drying device for pets is provided with the stationary air outlets and the adjustable air outlet, wherein the adjustable air outlet is connected with the tube 6, and the tube is provided with the support frame and thus can be moved to be mounted at a position beyond the reach of the stationary air outlets.

7. The pet cage (cage) is formed by a plurality of pieces which are assembled through rotary shafts, thereby being convenient to fold.

8. The front shell 12 and the main body 21 are locked and fixed together, the stationary frame 22 is arranged in an inner cavity defined by the front shell and the main body, and the stationary frame is matched with the main body to form the air supply passages.

9. The collection tray 11 is arranged at the bottom of the pet cage (cage) and is used for collecting water drops and pet hair.

10. The stationary air outlets and the air ducts are in an arc shape, so that an arc-shaped surrounding air flow is generated after air is blown out, the pet drying area is enlarged, the situation that the rear part of pets cannot be dried due to blockage by the front part is avoided; and the fixing position of the tube at the adjustable air outlet can be adjusted to blow air to dead spaces of the pet cage.

The above embodiments are only illustrative ones implemented based on the technical contents of the invention. Any modifications and variations made by those skilled in this field should also fall within the patent scope of the invention. The protection scope of the invention is not limited the embodiments disclosed above.

What is claimed is:

1. An automatic blow-drying device for pets, comprising a pet cage and a drying unit, wherein the drying unit is arranged on one side of the pet cage and comprises an air source, air supply passages are respectively arranged on two sides of the air source and are provided with heating elements, the pet cage is provided with openings which are matched with the air supply passages to form stationary air ports, the air supply passages on the two sides are matched with the corresponding stationary air ports to allow an air flow to enter the pet cage to form a surrounding drying area, and the drying unit is connected with an adjustable air port used for blowing air into areas, except for the surrounding drying area, in the pet cage;

wherein the drying unit comprises a main body and a stationary frame, the main body is connected with the stationary frame, an air inlet is formed in a back of the main body, the main body is matched with the stationary frame to form a main air duct and air supply channels extending towards two sides, the main air duct is matched with the air supply channels to form the air supply passages, a fan rotates in the main air duct to form the air source, and the air supply channels are provided with arc-shaped passages towards the stationary air ports, so that arc-shaped surrounding air flows are formed after air is blown out;

wherein an outlet is formed in a top of the main air duct of the drying unit and is connected with a tube which extends towards a top surface of the pet cage to form the adjustable air port; the tube is provided with a support frame, thereby being convenient to move and position; and a plurality of holes allowing air from the tube to enter are formed in the top surface of the pet cage.

2. The automatic blow-drying device for pets according to claim 1, wherein an air inlet is formed in an outer side of the drying unit, a main air duct is formed in the drying unit and is provided with a plurality of notches to be connected with the stationary air ports in the pet cage, heating pieces are arranged at the notches, and temperature switches are arranged on the heating pieces to make sure that an outlet air temperature is within a reasonable temperature range.

3. The automatic blow-drying device for pets according to claim 2, wherein the drying unit is provided with a control panel, the control panel is connected with a control circuit, and a motor and the temperature controllers are connected to the control circuit.

4. The automatic blow-drying device for pets according to claim 1, wherein the pet cage is a foldable cage and is defined by a front shell, a rear shell, a top cover, two side faces and a bottom face, wherein the top cover has a front part hinged to the front shell through a rotary shaft and is provided above the two side faces and the rear shell; each said side face has a front part hinged to the front shell through a rotary shaft and a rear part hinged to the rear shell through a rotary shaft, a four-faced structure of the pet cage is formed by the two side faces, the front shell and the rear shell, bottoms of the two side faces abut against corresponding sides of the bottom face, and each said side face comprises two pieces which are connected through a rotary shaft, so that panels capable of being folded inwards are formed; the bottom face has a front part hinged to the front shell through a rotary shaft and a rear part in butt joint with the rear shell.

5. The automatic blow-drying device for pets according to claim 4, wherein a collection tray used for collecting water drops and pet hair is arranged at a bottom of the pet cage.

6. The automatic blow-drying device for pets according to claim 5, wherein when the pet cage is folded, the bottom face and the collection tray are turned upwards first, then the two side faces are folded towards a middle, the rear shell is pushed towards the front shell to be stacked on the side faces, and finally, the top cover moves downwards to cover the rear shell.

7. The automatic blow-drying device for pets according to claim 6, wherein a front side of the front shell is matched with a main body of the drying unit and is provided with a seal ring part matched with the main body, extension parts extending backwards are formed on a periphery of a back side of the front shell and are respectively connected with the top cover, the side faces and the bottom face, and the extension part, matched with the top cover, of the front shell is higher than the extension parts, matched with the side faces and the bottom face, of the front shell.

8. The automatic blow-drying device for pets according to claim 5, wherein a front side of the front shell is matched with a main body of the drying unit and is provided with a seal ring part matched with the main body, extension parts extending backwards are formed on a periphery of a back side of the front shell and are respectively connected with the top cover, the side faces and the bottom face, and the extension part, matched with the top cover, of the front shell is higher than the extension parts, matched with the side faces and the bottom face, of the front shell.

9. The automatic blow-drying device for pets according to claim 4, wherein the front shell and the main body are locked and fixed together, the front shell is provided with the stationary air ports matched with the drying unit, the rear shell is a baffle, the top cover, the two side faces and the bottom face are provided with a plurality of through holes, and the top cover and the rear shell are locked and fixed together through a buckle.

10. The automatic blow-drying device for pets according to claim 9, wherein a front side of the front shell is matched with a main body of the drying unit and is provided with a seal ring part matched with the main body, extension parts extending backwards are formed on a periphery of a back side of the front shell and are respectively connected with the top cover, the side faces and the bottom face, and the extension part, matched with the top cover, of the front shell is higher than the extension parts, matched with the side faces and the bottom face, of the front shell.

11. The automatic blow-drying device for pets according to claim 4, wherein a front side of the front shell is matched with a main body of the drying unit and is provided with a seal ring part matched with the main body, extension parts extending backwards are formed on a periphery of a back side of the front shell and are respectively connected with the top cover, the side faces and the bottom face, and the extension part, matched with the top cover, of the front shell is higher than the extension parts, matched with the side faces and the bottom face, of the front shell.

* * * * *